United States Patent
Stringer

(10) Patent No.: US 10,318,345 B2
(45) Date of Patent: Jun. 11, 2019

(54) DYNAMIC PRIORITY QUEUE

(71) Applicants: HISENSE USA CORP., Suwanee, GA (US); Hisense Electric Co., Ltd., Qingdao, Shandong (CN); Hisense International Co., Ltd., Qingdao (CN)

(72) Inventor: Roger Stringer, Suwanee, GA (US)

(73) Assignees: HISENSE USA CORP., Suwanee, GA (US); HISENSE ELECTRIC CO., LTD., Qingdao (CN); HISENSE INTERNATIONAL CO., LTD., Qingdao (CN)

( * ) Notice: Subject to any disclaimer, the term of this patent is extended or adjusted under 35 U.S.C. 154(b) by 0 days.

(21) Appl. No.: 14/691,512

(22) Filed: Apr. 20, 2015

(65) Prior Publication Data

US 2016/0306657 A1    Oct. 20, 2016

(51) Int. Cl.
*G06F 9/46* (2006.01)
*G06F 9/48* (2006.01)

(52) U.S. Cl.
CPC .................. *G06F 9/4881* (2013.01)

(58) Field of Classification Search
CPC ............................ G06F 9/4818; G06F 9/4881
USPC .................... 717/159–161; 718/103
See application file for complete search history.

(56) References Cited

U.S. PATENT DOCUMENTS

| | | | | |
|---|---|---|---|---|
| 5,937,205 A | * | 8/1999 | Mattson | G06F 13/1642 710/41 |
| 7,823,157 B2 | * | 10/2010 | Need | G06F 9/4443 718/108 |

OTHER PUBLICATIONS

Zhang et al., "A Priority Queue Algorithm for the Replication Task in HBase", 2013, Journal of Software, vol. 8, No. 7, pp. 1765-1769.*
Microsoft TechNet, "Priority queuing", Jan. 2013, retrieved from https://technet.microsoft.com/en-us/library, 3 pages.*
Microsoft TechNet, "Queues", Oct. 2013, retrieved from https://technet.microsoft.com/en-us/library, 12 pages.*

* cited by examiner

*Primary Examiner* — Ted T. Vo
(74) *Attorney, Agent, or Firm* — Gordon & Rees LLP

(57) ABSTRACT

The present disclosure relates to dynamic queue placement. In one embodiment, a method includes receiving a plurality of items for processing by a computing device, wherein each item received by the computing device is associated with a priority type. The method also includes determining a computed code for the plurality of items to assign a processing order in a queue for each of the plurality of items. The computed code is based on a timeout period for a lowest priority item of the plurality of items, and a safety margin interval of each of the plurality of items, the safety margin level including a time period for processing an item. The method may also include placing the plurality of items into the queue based on the computed code of each item.

21 Claims, 5 Drawing Sheets

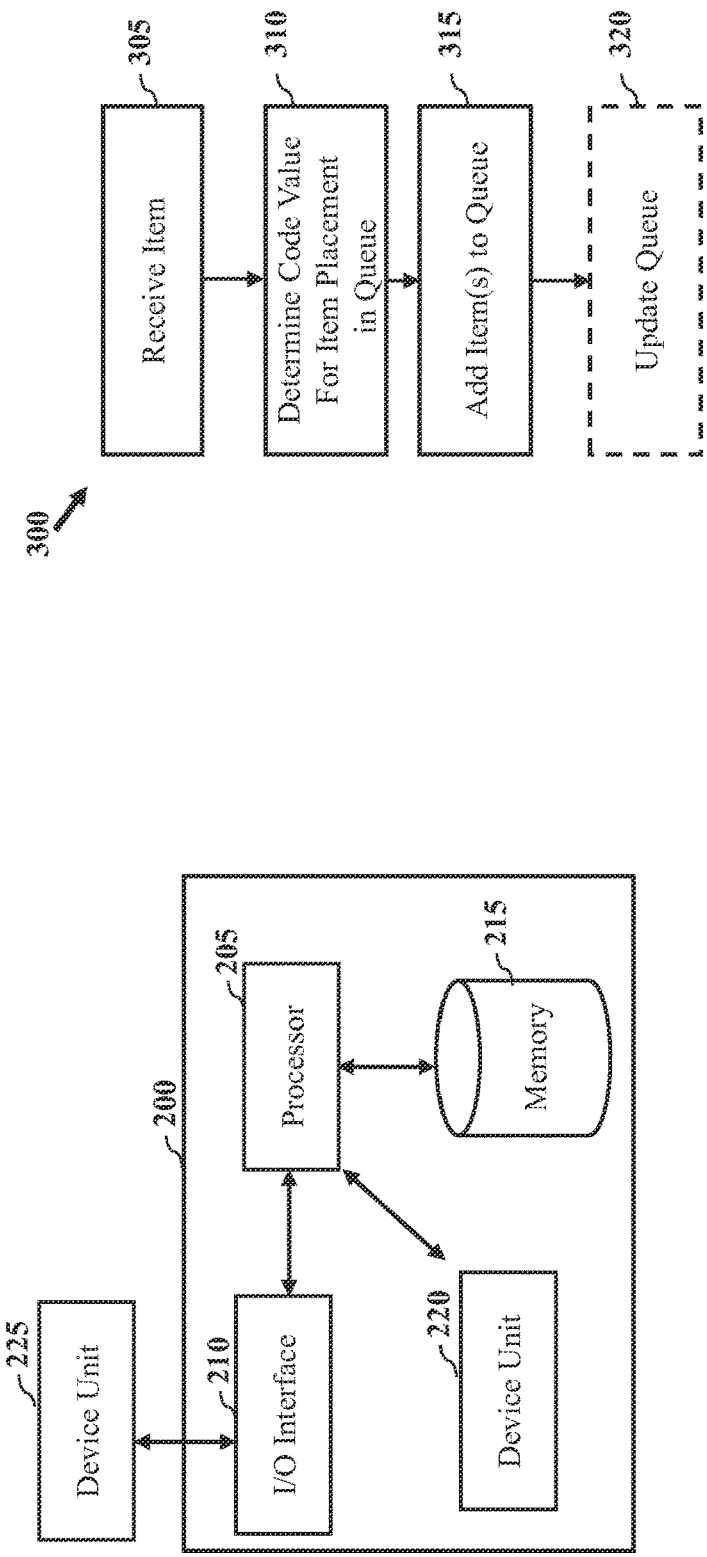

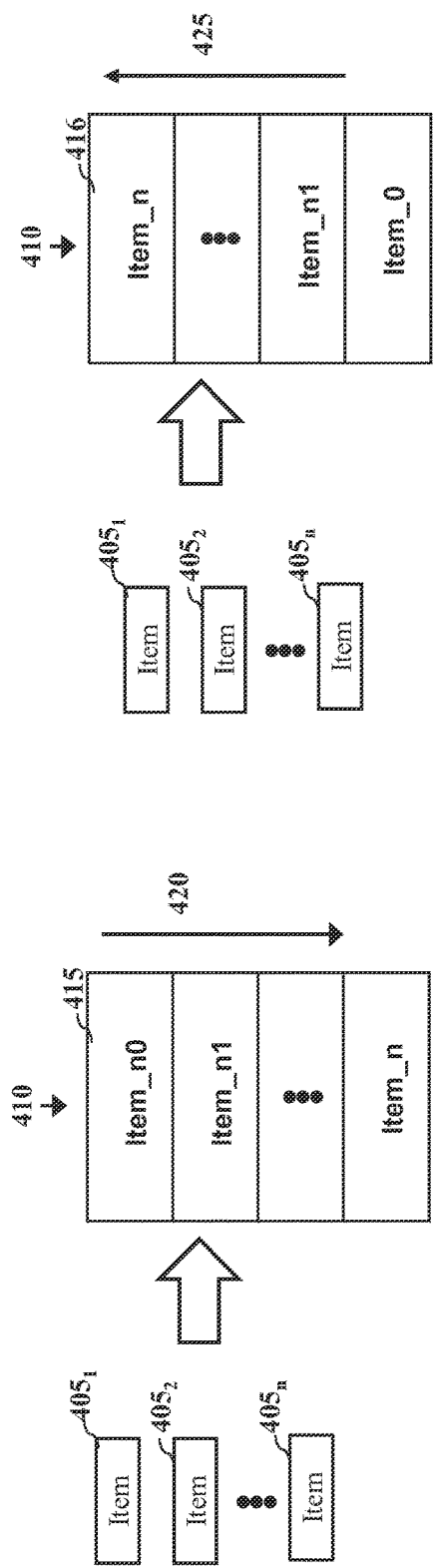
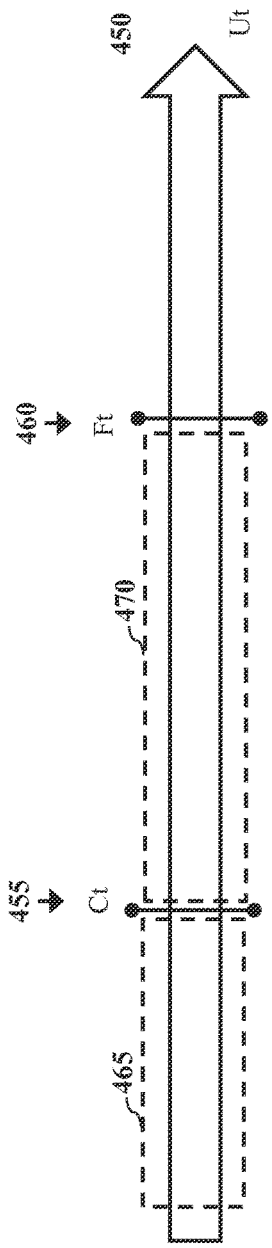
FIG. 4A
FIG. 4B
FIG. 4C

DYNAMIC PRIORITY QUEUE

FIELD

The present disclosure relates generally to computing devices and methods, and more particularly to configurations and methods for dynamic placement of items in queues.

BACKGROUND

Prioritized queues allow for items to be processed based on priority. However, assigning priority to requests for a processor solely based on priority levels can lead to higher priority requests reducing the effect of lower priority requests. By way of example, low priority requests may not be processed with conventional methods due to a processor servicing higher priority items before servicing lower priority items. Similarly, some requests for a processor may time out due to delay in handling items based solely on priority. There is a need and a desire for queue placement and order setting that allows for lower priority items to be processed while servicing high priority requests.

BRIEF SUMMARY OF THE EMBODIMENTS

Disclosed and claimed herein are devices and methods for dynamic queue placement. In one embodiment, a method for dynamic queue placement for a processor of a computing device includes receiving, by a computing device, a plurality of items for processing by the computing device, wherein each item received by the computing device is associated with a priority type. The method also includes determining a computed code, by the computing device, for the plurality of items, wherein the computed code is determined to assign a processing order in a queue for each of the plurality of items and wherein the computed code is based on a timeout period for a lowest priority item of the plurality of items, and a safety margin interval of each of the plurality of items, the safety margin interval including a time period for processing an item. The method also includes placing the plurality of items into the queue, by the computing device, based on the computed code of each item determined by the computing device.

In one embodiment, items received by the computing device relate to one or more of a task, request, and process to be executed by a processor of the computing device.

In one embodiment, each item is associated with one of a low priority, medium priority and high priority.

In one embodiment, the computed code for each item determines a relative time frame to be determined for each received item, the relative time frame indicating a time interval to process the item.

In one embodiment, the computer time is based on a universal time that is associated with a predetermined future time value.

In one embodiment, the plurality of items for processing are placed in the queue based on the computed code such that items with the shortest computed time are computed first.

In one embodiment, the timeout period is a maximum time interval for delaying a lowest priority item, the timeout period corresponds to one of negative, zero and positive values.

In one embodiment, the safety margin interval is a fixed time value.

In one embodiment, the method further includes determining an adjustment value to account for items having the same maximum time interval or timeout duration and safety margin interval.

In one embodiment, the computed code is based on a time system with unsigned values and the computed code is upshifted by a constant factor to ensure all values are adjusted.

In one embodiment, items with duplicate code values are supported by the queue.

Another embodiment is directed to a device including an input/output block for receiving one or more items, and a processor. The processor is configured to receive a plurality of items for processing, wherein each item received by the computing device is associated with a priority type. The processor is configured to determine a computed code for the plurality of items, wherein the computed code is determined to assign a processing order in a queue for each of the plurality of items wherein the computer code is based on a timeout period for a lowest priority item of the plurality of items, and a safety margin interval of each of the plurality of items, the safety margin level including a time period for processing an item. The processor is configured to place the plurality of items into the queue based on the computed code of each item received by the computing device.

Other aspects, features, and techniques will be apparent to one skilled in the relevant art in view of the following description of the embodiments.

BRIEF DESCRIPTION OF THE DRAWINGS

The features, objects, and advantages of the present disclosure will become more apparent from the description set forth below when taken in conjunction with the drawings in which like reference characters identify correspondingly throughout and wherein:

FIG. 2 depicts a simplified block diagram of a device according to one or more embodiments;

FIG. 3 depicts a process for queue placement according to one or more embodiments;

FIGS. 4A-4C depict graphical representations of queue characteristics according to one or more embodiments.

DESCRIPTION OF THE EXEMPLARY EMBODIMENTS

Overview and Terminology

Figure 1:
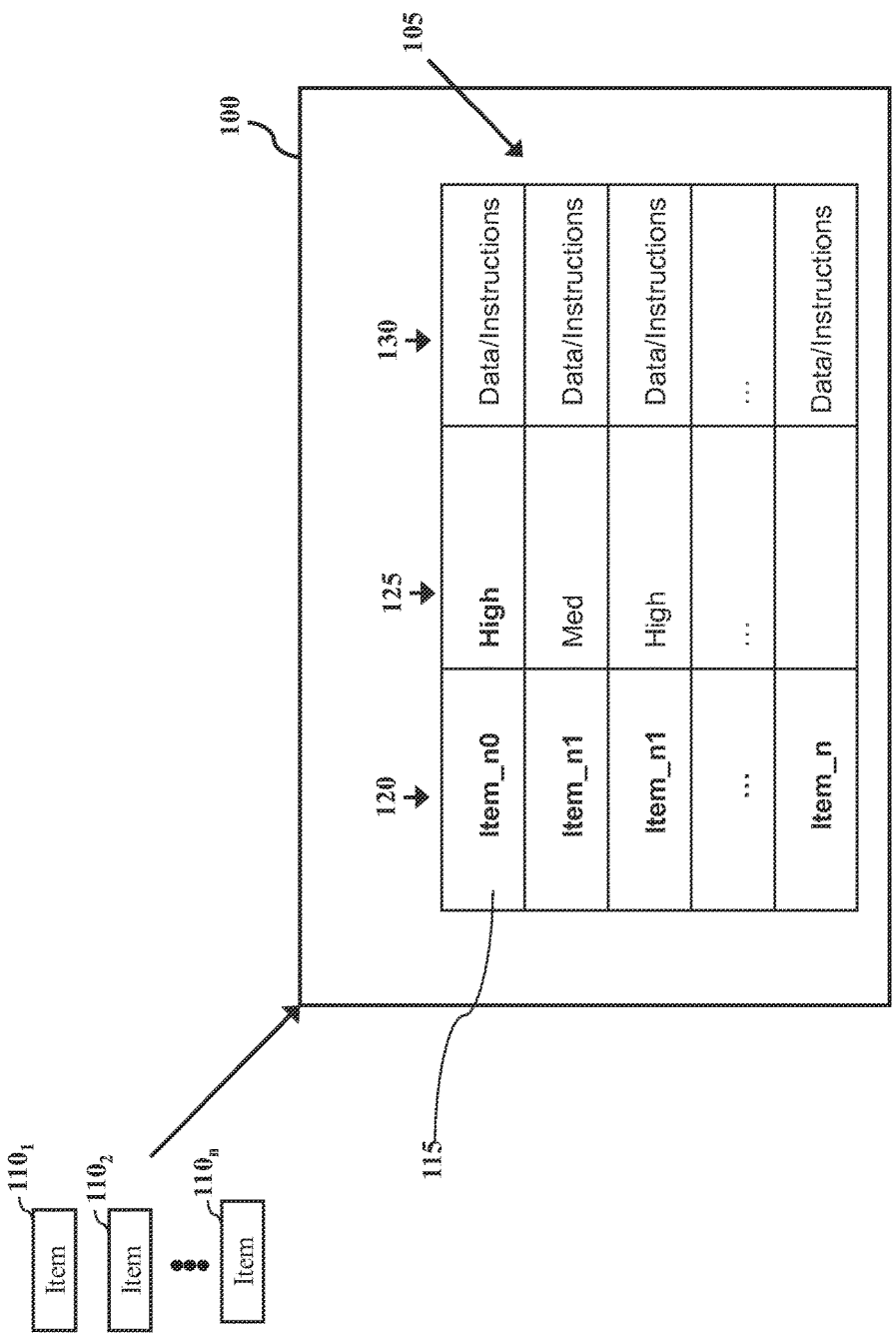
FIG. 1 depicts a graphical representation of a dynamic priority queue according to one or more embodiments.

One aspect of the disclosure is to provide devices and methods to dynamically queue items for processing. As will be discussed below, a device and processes are provided for dynamic queueing of items received by a device. In particular, devices and processes are provided to allocate and/or provide the service order for items associated with one or more priorities. The processes and device configurations discussed herein may reduce delay and allow for lower priority items to be processed ahead of higher priority items in order to prevent timeout and/or starvation.

Embodiments of the disclosure provide improvements to processing of items by a processor. By way of example, processes and hardware configurations are provided for priority queues to prevent higher priority items freezing out lower priority items without continually having to farm the queue to bring forward necessary but lower priority items. The processes and devices described herein can provide a self-leveling mechanism to reduce the effective priority level of excessive numbers of higher priority items and to allow processing of lower priority items.

According to one embodiment, items received by a processor may be classified with a computed code. The computed code may be a value to account for priority of each item and move the priority rating or classification from simply being measures of relative importance to measures of how long a higher priority item can suppress a lower priority item. In that fashion, each item is assigned a computed code and then inserted into the queue based on the computed code, the computed code accounting for priority and in some cases an adjustment value, with new items of the lowest priority being inserted at the end of the queue and new items with the highest priority being inserted near the head of the queue.

As used herein, an item can relate to one or more of a task, request, and process to be executed by a processor of a computing device.

A queue relates to a sequence of handling, such as an order (e.g., defined order, etc.) for processing items by a computing device such as a processor. In certain embodiments, a queue relates to items required for processing to provide operation by a device, such as the processing for a processor to provide the operation of a computing device. In other embodiments, a queue may relate to items or tasks associated with communication operations.

Priority, as used herein, can relate to one or more different priority classes or priority types associated with items received for processing. In certain embodiments, items may be assigned a priority prior to being received for placement in a queue. Priority may be based on a priority classification. For example, priority may be associated with three classes: low; medium; and high priority ratings. In other embodiments, different or other priority classifications may be employed for classifying items.

As used herein a processor relates to one or more of a processor, central processing unit (CPU), microprocessor, controller and data processing element in general. In certain embodiments, references to processors and/or computing devices relate to hardware devices for processing information, such as items.

Computing time as used herein relates to units of time and may include processor ticks, microseconds, nanoseconds, etc. Computed codes may be determined for items based on a universal time (Ut) which may relate to an incrementing measure of time which is not subject to abrupt changes other than a normal progression. Computing time may be based on a universal time clock (UTC). Current time (Ct) may be a reference to a current time in universal time. Future time (Ft) may be a universal time in the future, such as a predetermined marker or point of reference that may be employed for processing items. By way of example, future time may be a predetermined amount of processor ticks or a predetermined time value in advance of the current time.

Computer systems (e.g., operating systems, operating configurations, controllers, etc.) may utilize queue of commands, requests, and operations. In addition to device operation, priority queues may be employed for telecommunications systems.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment," "certain embodiments," "an embodiment," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation.

Exemplary Embodiments

Referring now to the figures, FIG. 1 depicts a graphical representation of a dynamic priority queue according to one or more embodiments. According to one embodiment, device 100 and the processes described herein improve the functionality of processors to handle items, including items with different priorities. Device 100 is depicted as including a queue 105. According to one or more embodiments, device 100 may receive one or more items, shown as items $110_{1-n}$, for processing. Items $110_{1-n}$ may relate to requests, instructions, commands, messages, etc. for device 100 to process. According to one embodiment, methods and devices are providing for ordering received items, such as items $110_{1-n}$, into queue 105.

According to one embodiment, device 100 may be configured to order items $110_{1-n}$, for placement into queue 105. The order and/or placement of items may be based on a computed code generated for received items. As will be discussed below, a computed code may be determined for received items, such as items $110_{1-n}$ by device 100. The computed code may determine placement order and may allow for dynamic placement of items $110_{1-n}$ as received by device 100 into queue 105 and allow for prevention of higher priority items from freezing out lower priority items. By way of example, the computed code may allow for determining the length of time that higher priority item can safely preempt one or more lower priority items or items in the queue in general. The computed code may also account for a safety margin with respect to items.

FIG. 1 also depicts placed items, such as item 115 into queue 105. According to one embodiment, queue 105 is represented as a list or table. However, device 100 may store queue 105 and placed items, such as item 115 in memory. Ordering and/or processing of placed items in queue 105 may be based on the items, such as items associated with item identification number 120, in the queue, priority levels associated with each item, shown as priority levels 125, and data and/or instructions associated with each item, shown as metadata 130. For purposes of representation, exemplary characteristics and data of a placed item are represented as item identification number 120, priority 125 and metadata (e.g., data/instructions) 130 and are shown in table format. It should be appreciated that the processes and devices described herein do not require placement or formatting of data in a table for processing in a queue. As such, the table representation in FIG. 1 is for illustration. It should also be appreciated that the device and methods described herein do not require items $110_{1-n}$ to include metadata 130 for processing. Alternatively, it should also be appreciated that the device and methods described herein do not require items $110_{1-n}$ to include priority levels 125 separate from an item identification number 120 or metadata 130, as the priority level of each item may be determined from metadata 130 or based on the item as received. Item identification number 120 is represented in FIG. 1 to illustrate that multiple items may be placed in queue 105. It should be appreciated that items, such as item 115 do not require numbering. In a similar fashion, metadata 130 represents data that may be associated with certain items. It should also be appreciated that items, such as item 115, do not require metadata. Multiple priority classifications can be placed in the same queue. In certain embodiments, different item types (e.g., commands, request messages, etc.) may be placed in the same queue.

Device 100 may relate to a computing device, processor, controller, or one or more other types of devices configured to process information, such as items $110_{1-n}$. Device 100 may be configured as the device illustrated in FIG. 2 and described below. Device 100 may be configured to execute one or more processes, such as the process of FIG. 3 and/or processes stored in memory for placement of items $110_{1-n}$ in queue 105. Device 100 and the processes described herein improve the functionality of a device, to prevent high priority items from blocking execution of low priority items. In addition, the disclosure provides one or more device configurations, in addition to a general computer/processor for dynamic queue placement, including but not limited to management of processes within a computing device.

In certain embodiments, device 100 may be associated with a multi-server system, such that queue 105 may be associated with items of the multi-server system associated with multiple processors. In other embodiments, device 100 may be associated with one or more of memory placement, such as placement of items into a plurality of queues associated with the plurality of banks of the memory, an attributes register configured to store attributes of memory service instructions, a content addressable memory configured to store memory access addresses of the memory service instructions, and a queue control configured to control placement of memory service instructions in the plurality of queues based upon the attributes and the memory access address.

In certain embodiments, device 100 may be a hardware unit separate from a processor. In other embodiments, device 100 may be built into the processor, such as a specific hardware element that is part of the processor or adjacent to the processor for queue placement.

FIG. 2 depicts a simplified block diagram of a device according to one or more embodiments. According to one embodiment, device 200 may relate to one or more of a computing device, electronics device, communication device, server, and devices in general. Device 200 may relate to the device of FIG. 1 according to one or more embodiments.

In certain embodiments, device 200 represents at least a portion of a computer system. As such, when device 200 is part of a computing system, such as a portion of a computing system, processor 205 may relate to one or more controllers of the computing system. In other embodiments when device 200 is a central processing unit (e.g., CPU), processor 205 relates to a CPU processor. In other embodiments, device 200 may relate to a device (e.g., portable device, display device, device in general, etc.). As such, processor 205 may relate to one or more of a controller, microprocessor, etc.

Device 200 includes processor 205. Processor 205 may be configured to execute one or more operations for device 200. In certain embodiments, the items (e.g., items $110_{1-n}$) received by processor 205 are placed into a queue for processing. Items received by processor 205 may be received internally of device 200 and/or from external elements of device 200. In other embodiments, items received for processing may relate to items received by processor 205.

Processor 205 may be configured to execute code stored in memory 215 for operation of device 200 including placement of items into a queue and processing items of the queue. In certain embodiments, operation of processor 205 may be embodied by a controller. Processor 205 may include one or more processing elements in addition to the processor. In one embodiment processor 205 may be include one or more of hardware, software, firmware and/or processing components in general. According to one embodiment, processor 205 may be configured to perform one or more processes described herein, such as the process of FIG. 3.

According to another embodiment, device 200 includes inputs/output (I/O) interface 210, memory 215, and device unit 220. I/O interface 210 may be configured to receive data for and/or transmit data from processor 205 to external devices, such as device unit 225. Memory 215 may include non-transitory RAM and/or ROM memory for storing executable instructions. Device unit 220 may be configured to generate items for processing by processor 220. In certain embodiments, device 200 may receive items from a unit external to device 200, such as device unit 225.

FIG. 3 depicts a process for queue placement according to one or more embodiments. Process 300 may be employed for dynamic queue placement for a processor (e.g., processor 205) of a computing device (e.g., device 100). Dynamic queue placement for a processor can include generating a computed code for each item directed to a processor for processing. In contrast to simply assigning each received request with a number or order, or processing simply based on priority with high priority items being completed prior to low priority items, process 300 may account for time intervals that low items can be delayed. In addition, queue placement may be based on a safety margin interval for received items, and the safety margin interval may be a fixed time value. Thus, in contrast to simply selecting the highest priority item to process, process may preempt processing of higher priority items in order to prevent blocking or timeout of lower priority items.

Process 300 may be performed by one or more types of devices, such as the devices of FIGS. 1 and 2. Process 300 may be initiated at block 305 with a computing device receiving a plurality of items (e.g., items $110_{1-n}$) for processing. According to one embodiment, each item received by the computing device is associated with a priority type. According to one embodiment, each item may be associated with one of a low priority, medium priority and high priority. However, it should be appreciated that items may be classified with different priority levels, priority sub-levels and/or ranking schemes. Items received by the computing device can relate to one or more of a task, request, and process to be executed by a processor of the computing device.

According to one embodiment, item (e.g., items $110_{1-n}$) priorities for items received by process 300 may be internal or external to a device. For example, internal priorities may be determined by factors such as time limits, memory requirements, and other system-related factors. External priorities may be assigned to items by item originators or system administrators. According to another embodiment, priorities for items received at block 305 be static or dynamic. When static, the item retains its priority until processed. With a dynamic priority, the process may allow for item priorities to change while in queue.

In certain embodiments, priorities of the received items may be dynamic. The computed code may be based on the priority of an item when received. In certain embodiments, the computed code may account for dynamic priorities by adjusting the computed code and/or queue order when the priority of an item changes.

At block 310, a computed code is determined by the computing device for each item received by the computing device. According to one embodiment, the computed code is determined to assign a processing order in a queue for the plurality of items for each of the plurality of items. The computed code for each item allows a relative time frame to be determined for each received item, the relative time frame indicating a time interval the item should be processed in. According to another embodiment, the computed code is based on the timeout period for a lowest priority item (e.g., maximum time interval that a lowest priority item of the plurality of items can be delayed), and a safety margin interval of each of the plurality of items, the safety margin level including a time period for processing an item. The maximum time interval that a lowest priority item can be delayed corresponds to one of a negative, zero and positive values. The safety margin value may be a fixed value. The computed code may be based on an adjustment value to provide for items having the same timeout period (e.g., maximum time interval) and safety margin interval. The computed code value is for use with a time system with unsigned values and the code value may be upshifted by a constant factor to ensure all values are adjusted. Items with duplicate code values may be supported by the queue.

According to one embodiment, the computed code at block 310 provides a length of time that the higher priority item can safely preempt the lower priority items, after being adjusted by a safety margin. Computed code values at block 310 may employ the priority time adjustment values discussed below in FIGS. 4A-4C (e.g., formulas 1-3).

According to one embodiment, computer time at block 310 is based on a universal time that may be associated with a predetermined time amount in the future. For example, and as will be discussed below with respect to FIGS. 4A-4C, a future time may be a predetermined time from the current computer time relative to the time period items are received for processing.

In certain embodiments, the computed code generated at block 310 may be based on the arrival rate of items for a processor. In that fashion, the time period for delay and/or period for delaying in a queue may be extended when the arrival of items slows. Similarly, the time period for delay and/or period for delaying in a queue may be adjusted when the arrival of items increases.

At block 315, the computing device places the plurality of items into the queue based on the computed code of each item received by the computing device. Items are placed in the queue based on the computed code so that items with the shortest computer time will be computed first.

Process 300 may allow for the relative importance of items to be precisely defined while avoiding starvation (e.g., non-scheduling of an item) and indefinite postponement of lower priority processes.

Process 300 may optionally include updating the queue at block 320. In certain embodiments, process 300 may place and order items based on items received by the computing device. In other embodiments, a queue may be updated when additional items are received.

FIGS. 4A-4C depict graphical representations of queue characteristics according to one or more embodiments. According to one embodiment, items may be placed in an ascending or descending queue. Reference to ascending or descending within a computing device is relative to a computer time of the computing device.

FIG. 4A depicts a representation of a queue with placement of items in a descending order. According to one embodiment, items $405_{1-n}$ may be placed into queue 410. As shown, item 415 is depicted as the first item in line for processing with processing order shown as 420. According to one embodiment, determining a computed code, by the computing device, for each item received by the computing device is based on placement of the items in a descending queue, such as queue 410 of FIG. 4A. In that fashion, the computed code is determined relative to the current computer time. According to one embodiment, a computed code value "V" may be determined relative to a current computer time according to the following formula:

$$V=(Ct-Pt) \quad \text{Formula 1}$$

where:
"Ct" is the current time in universal time; and
"Pt" is a priority time adjustment factor.

According to certain embodiments, the decision for priority or relative priority of items $405_{1-n}$ for placement into queue 410 may be the length of time that the higher priority item can safely preempt the lowest priority item, less a safety margin. In an exemplary embodiment, the processes and devices described herein may be configured to employ a dynamically changing queue of items with multiple kinds of priorities, such as for example: low, medium and high. In an exemplary embodiment: "Low" priority items can wait 30 seconds before the request exceeds a timeout period that will require resubmission of the request or that will generate an error; "Medium" priority items can wait five seconds before timeout of the request; and "High" priority items must be processed as quickly as possible.

In an exemplary embodiment, assuming a time increment of 100 per second, and a 20% safety margin, the priority time adjustment factor "Pt" for the three types of items would be: {{"Low":0}, {"Medium": 2000}, {"High": 2400}}. By way of example, a "high" priority adjustment factor may be computed as the number of seconds (e.g., 30) multiplied by the time increment (100 per second) with the safety margin subtracted (e.g., "High" computation: 30*100=3000; and 3000−20%*3000=2400). By way of example, a "medium" priority adjustment factor may be computed as the number of seconds (e.g., 5) multiplied by the time increment (100 per second) with the safety margin subtracted (e.g., "Medium" computation: 5*100=500; and 500−20%*500=400). The priority adjustment factor for a medium priority type relative to the high priority type would be computed by subtracting the medium priority adjustment factor from the high priority adjustment factor (e.g., "High" relative to "Medium": 2400−400=2000).

Benefits of the computed code configuration include effective dealing with short bursts of higher priority items. For example, as high priority items arrive, they go near the top of the queue, immediately behind unprocessed prior high priority items and ahead of lower priority items. A benefit may also be that when a stream of higher priority items is received, at a rate equal to or higher than they can be processed. By way of example, in contrast to a simple priority-based queue where higher priority items would preempt all other items and only high priority items would be processed and the lower priority items would wait longer than their timeouts, employing a computed code allows for medium and low priority items to be processed as high priority items flood the queue. As such, there still may be a bias towards the higher priority items; however, lower priority items will not be preempted.

Another benefit may include that mistakes in assigning priority levels or in forecasting frequency or system loads of higher priority items would no longer render a system non-functional, nor have the effect of a Denial Of Service (DOS) attack. Instead the system as a whole would degrade and the higher priority items causing the overflow would effectively have their priority degrade dynamically.

FIG. 4B depicts a representation of a queue with placement of items in an ascending order. According to one embodiment, items $405_{1-n}$ may be placed into queue 410. As shown, item 416 is depicted as the last item in line for processing with processing order shown as 425. According to one embodiment, determining a computed code, by the computing device, for each item received by the computing device is based on placement of the items in an ascending queue, such as queue 410 of FIG. 4B. In that fashion, the computed code is determined relative to the current computer time and a future time. According to one embodiment, a computed code value "V" may be determined relative to a current computer time according to following formula 2.

$$V=((Ft-Ct)+Pt) \quad \text{Formula 2}$$

where:
"Ft" is a universal time in the future;
"Ct" is the current time in universal time; and
"Pt" is a priority time adjustment factor.

As used herein references to universal time (Ft), current time (Ct), and priority time adjustment factor (Pt) all use the same increment of time. By way of example, units of time may includes processor ticks, microseconds, nanoseconds, etc.

FIG. 4C provides a graphical representation of a timeline that may be associated with computed codes for items. According to one embodiment, computed codes may be determined for items based on a universal time (Ut) 450. Universal time may relate to an incrementing measure of time which is not subject to abrupt changes other than a normal progression, such as universal time clock (UTC) or processor tick increments. Current time (Ct) 455 represents a current time in universal time. Future time (Ft) 460 is a universal time in the future. Future time (Ft) 460 can remain constant while the queue is not empty, but may be reset to another time when the queue is empty.

Area 465 relates to an area or section with respect to universal time and the current time 455 where a computed code may fall for items determined relative to a descending queue (e.g., formula 1). Area 470 relates to an area or section with respect to universal time and the current time 455 and a future time 460 where a computed code may fall for items determined relative to a descending queue (e.g., formula 1).

According to one embodiment, the computed code is a priority time adjustment factor, such as Pt of formulas 1 and 2 above. According to one embodiment, the computed code value may be calculated as a priority time adjustment factor (Pt) computed as:

$$Pt=(Kt-Mt-At)) \quad \text{Formula 3}$$

where:
Kt" is the maximum time interval that the lowest necessary priority item can be delayed, and may be negative, zero or positive;

"Mt" is the safety margin interval when it is prudent to begin processing the item, which may be a fixed value or some computed value, and may be zero; and "At" is an adjustment value to provide for relative priority of items with the same (Kt−Mt) value.

The higher relative priority would have the lower "At" value. It may be negative, zero or positive. In certain embodiments, low priority items which can tolerate preemption shall have zero for "Mt" and a large negative value for "Kt"; the values for "At" represent the relative priority of these non-essential, lower priority items. The value of "Kt" shall be sufficient to prevent preemption of essential tasks. When used with a time system based on unsigned numbers, the computed code value "V" shall be upshifted by a constant factor to ensure all values are greater than or equal to zero. This constant factor may be reset when the queue is empty. When a new item is received, it is added to the queue at a position dictated by the computed code value "V" and the existing collection of items shall be adjusted accordingly. The action when "V" duplicates that of an existing item is not defined, except that the new item shall not replace the prior item, which implies that the logic which maintains the queue shall support items with duplicate "V". The queue may be processed by taking the item from the top of the queue. Depending on whether the queue is maintained in ascending or descending sequence, this will be the item with the highest or lowest "V", respectively. If items exist with duplicate "V" when that value is at the top of the queue, each of those items will be processed in a sequence which is undefined, though that sequence may be FIFO, LIFO, pseudo-random or some other sequence, before processing items with a different "V".

Figure 5A:
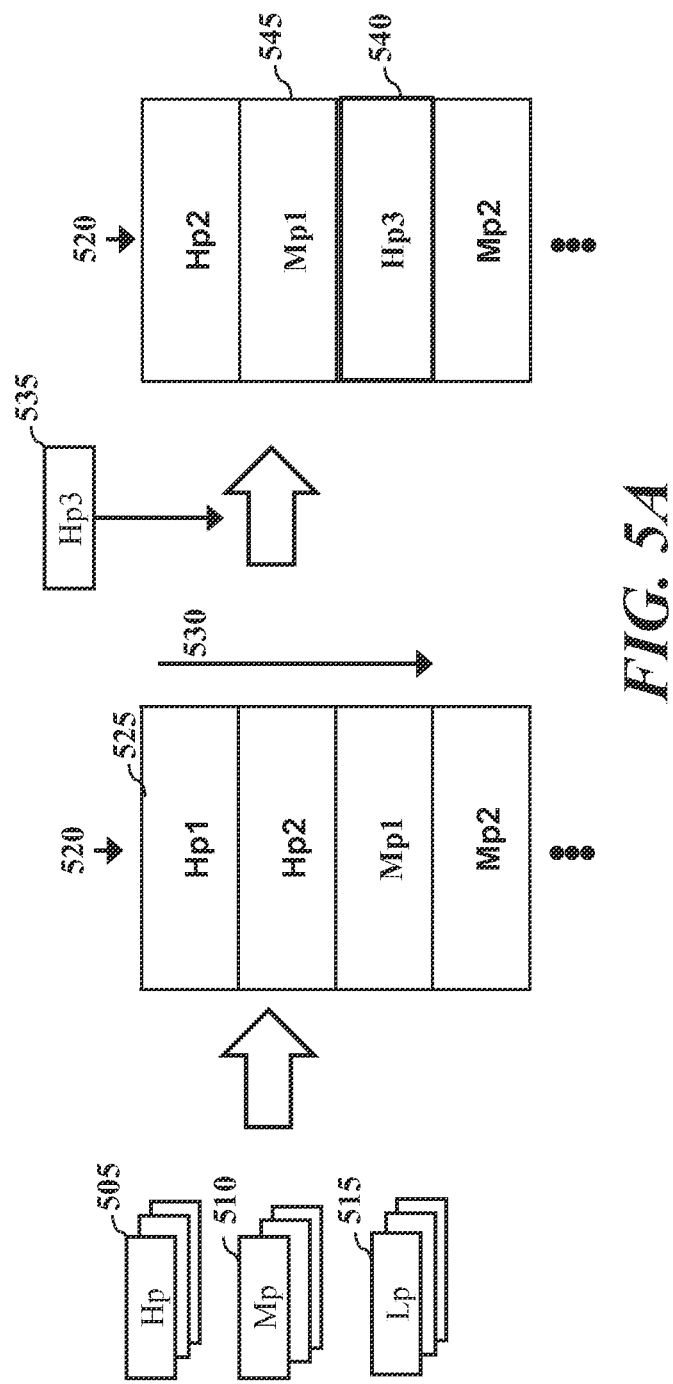
FIGS. 5A-5B depict graphical representations of a dynamic priority queue according to one or more embodiments.
Figure 5B:
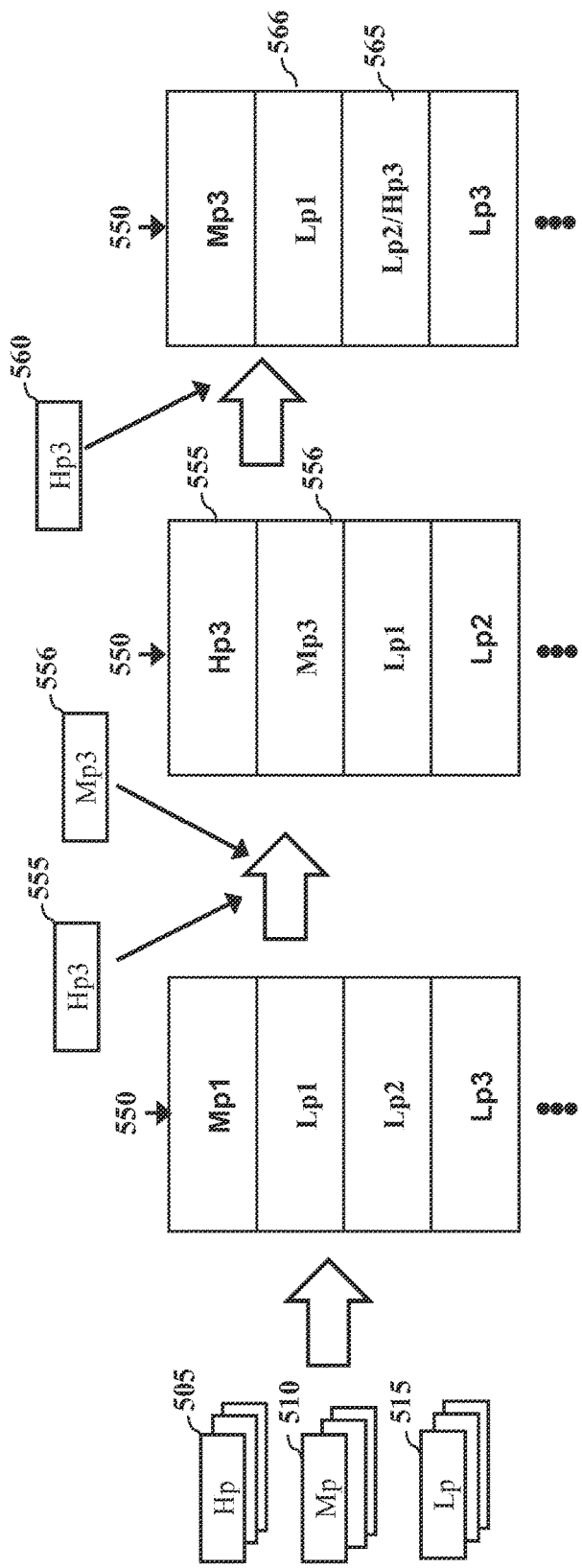

FIGS. 5A-5B depict graphical representations of a dynamic priority queue according to one or more embodiments. Referring to FIG. 5A, an exemplary representation of item placement is shown according to one or more embodiments. Items for placement in a queue in FIG. 5A are shown as having high priority items 505, medium priority items 510, and low priority items 515. It should be appreciated that items are limited to classification as only low, medium and high priorities and may be associated with other or different priority classifications.

FIG. 5A depicts a representation of a queue 520 with placement of items in a descending order. It should be appreciated that the principles described in FIG. 5A may be equally applied to queue placement in ascending order. According to one embodiment, items 505, 510 and 515 may be placed into queue 520. As shown, item 525 is depicted as the first item in line for processing with processing order shown as 530. According to one embodiment, queue 520 includes items with one or more different priority classifications. FIG. 5A also depicts the addition of an item, high priority item 535 into queue 520. According to one embodiment, a computed code is determined for high priority item 535 based on one or more attributes of the item and items in queue 520. Item 535 is show as item 540 in queue 520 such that placement of item 535 is based on the computed code value for the item. According to one embodiment, item 535 may be placed in queue 520 below an item with a lower priority, such as item 545. As such, placement of items in the queue 520 using a computed code may prevent time out or blocking of priority items.

FIG. 5B depicts an exemplary representation of item placement according to one or more embodiments. Items for placement in a queue in FIG. 5B are shown as having high priority items 505, medium priority items 510, and low priority items 515. It should be appreciated that items are limited to classification as only low, medium and high priorities and may be associated with other or different priority classifications.

FIG. 5B depicts a representation of a queue 550 with placement of items in a descending order. It should be appreciated that the principles described in FIG. 5B may be equally as applied to queue placement in ascending order. According to one embodiment, items 505, 510 and 515 may be placed into queue 550.

FIG. 5B depicts the addition of items, including high priority item 555 and medium priority item 556 into queue 520. According to one embodiment, a computed code is determined for high priority item 555 and medium priority item 556 based on one or more attributes of the items and items in queue 550. Item 560 may be received and placed into queue 550. Item 560 is a high priority item and is shown as item 565 in queue 520 such that placement of item 560 is based on the computed code value for the item. According to one embodiment, item 560 may be placed in queue 550 with the same processing time/collocated with another item. In addition, item 560 is placed beneath the priority of a low priority item 566 already in the queue. In that fashion, item 560 is placed below an item with a lower priority, such as item 565. As such, placement of items with higher priorities in the queue using a computed code may prevent time out or blocking of lower priority items.

While this disclosure has been particularly shown and described with references to exemplary embodiments thereof, it will be understood by those skilled in the art that various changes in form and details may be made therein without departing from the scope of the claimed embodiments.

What is claimed is:

1. A method for dynamic queue placement for a processor of a computing device, the method comprising:
   receiving, by a computing device, a plurality of items for processing by the computing device, wherein each item received by the computing device is associated with a priority type;
   determining a computed code, by the computing device, for the plurality of items, wherein the computed code is determined to assign a processing order in a queue for each of the plurality of items wherein the computed code is based on
      a timeout period for a lowest priority item of the plurality of items, wherein the timeout period is a maximum time interval for delaying a lowest priority item, and
      a safety margin interval of each of the plurality of items, the safety margin interval including a time period for processing an item;
   determining an adjustment value to provide for items having the same maximum time interval and safety margin interval; and
   placing the plurality of items into the queue, by the computing device, based on the computed code and the adjustment value of each item determined by the computing device.

2. The method of claim 1, wherein items received by the computing device relate to one or more of a task, request, and process to be executed by a processor of the computing device.

3. The method of claim 1, wherein each item is associated with one of a low priority, medium priority and high priority.

4. The method of claim 1, wherein the computed code for each item determines a relative time frame to be determined for each received item, the relative time frame indicating a time interval to process the item, and wherein the computed code provides a length of time that higher priority items can safely preempt lower priority items, after being adjusted by a safety margin interval.

5. The method of claim 1, wherein the computed code is determined relative to a computer time based on a universal time that is associated with a predetermined future time value.

6. The method of claim 1, wherein the plurality of items for processing are placed in the queue based on the computed code such that items with a shortest computed time are computed first.

7. The method of claim 1, wherein the timeout period corresponds to one of negative, zero and positive values.

8. The method of claim 1, wherein the adjustment value is determined based on a difference between the maximum time interval and a safety margin interval, the safety margin interval including a time period for processing an item.

9. The method of claim 1, wherein the computed code is based on a time system with unsigned values and the computed code is upshifted by a constant factor to ensure all values are adjusted.

10. The method of claim 1, wherein items with duplicate computed code values are supported by the queue.

11. A device comprising:
   an input/output block for receiving one or more items; and
   a processor configured to
      receive a plurality of items for processing, wherein each item received by the computing device is associated with a priority type;
      determine a computed code for the plurality of items, wherein the computed code is determined to assign a processing order in a queue for each of the plurality of items wherein the computed code is based on
         a timeout period for a lowest priority item of the plurality of items, wherein the timeout period is a maximum time interval for delaying a lowest priority item, and
         a safety margin interval of each of the plurality of items, the safety margin level including a time period for processing an item;
      determine an adjustment value to provide for items having the same maximum time interval and safety margin interval; and
      place the plurality of items into the queue based on the computed code and the adjustment value of each item determined by the computing device.

12. The device of claim 11, wherein items received by the computing device relate to one or more of a task, request, and process to be executed by a processor of the computing device.

13. The device of claim 11, wherein each item is associated with one of a low priority, medium priority and high priority.

14. The device of claim 11, wherein the computed code for each item determines a relative time frame to be determined for each received item, the relative time frame indicating a time interval to process the item, and wherein the computed code provides a length of time that higher priority items can safely preempt lower priority items, after being adjusted by a safety margin interval.

15. The device of claim 11, wherein the computed code is determined relative to a computer time based on a universal time that is associated with a predetermined future time value.

16. The device of claim 11, wherein the plurality of items for processing are placed in the queue based on the computed code such that items with a shortest computed time are computed first.

17. The device of claim 11, wherein the timeout period corresponds to one of negative, zero and positive values.

18. The device of claim 11, wherein the adjustment value is determined based on a difference between the maximum time interval and a safety margin interval, the safety margin interval including a time period for processing an item.

19. The device of claim 11, wherein the computed code is for use with a time system with unsigned values and the computed code is upshifted by a constant factor to ensure all values are adjusted.

20. The device of claim 11, wherein items with duplicate code values are supported by the queue.

21. A method for dynamic queue placement for a processor of a computing device, the method comprising:

receiving, by a processor of a computing device, a plurality of items for processing by the computing device, wherein each item received by the processor is associated with a priority type, and wherein the plurality of items received by the processor relate to one or more of a task, request, and process to be executed by the processor of the computing device;

determining a computed code, by the processor, for the plurality of items, wherein the computed code is determined to assign a processing order in a queue for each of the plurality of items wherein the computed code is based on a timeout period for a lowest priority item of the plurality of items, wherein the timeout period is a maximum time interval for delaying a lowest priority item, and a safety margin interval of each of the plurality of items, the safety margin interval including a time period for processing an item;

determining an adjustment value, by the processor, to provide for items having the same maximum time interval and safety margin interval;

placing, by the processor, the plurality of items into the queue based on the computed code and the adjustment value of each item determined by the computing device;

processing, by the processor, items in the queue based on processing order of the computed codes; and updating, by the processor, the queue based on one or more additional items received for processing.

* * * * *